United States Patent [19]

Nakamura et al.

[11] Patent Number: 5,477,373
[45] Date of Patent: Dec. 19, 1995

[54] LASER BEAM OPTICAL SCANNING DEVICE

[75] Inventors: Hiromu Nakamura; Satoru Ono, both of Toyokawa, Japan

[73] Assignee: Minolta Co., Ltd., Osaka, Japan

[21] Appl. No.: 149,613

[22] Filed: Nov. 9, 1993

[30] Foreign Application Priority Data

Nov. 12, 1992 [JP] Japan ..................... 4-302714

[51] Int. Cl.⁶ ................. G02B 26/08; B41J 2/47
[52] U.S. Cl. .............. 359/212; 359/216; 347/260; 347/261
[58] Field of Search ............... 359/196–221, 359/223, 226; 346/108, 160, 76 L; 355/233; 358/474, 296; 464/170; 347/256, 258–261, 241, 134

[56] References Cited

U.S. PATENT DOCUMENTS

| | | | |
|---|---|---|---|
| 5,227,811 | 7/1993 | Kohsaka | 359/216 |
| 5,299,051 | 3/1994 | Hirano | 359/216 |

FOREIGN PATENT DOCUMENTS 03200982  9/1991  Japan .

Primary Examiner—James Phan
Attorney, Agent, or Firm—Price, Gess & Ubell

[57] ABSTRACT

A laser beam optical scanning device including a housing, a light source for emitting a unidirectional laser beam, polygonal mirror for deflection scanning a laser beam emitted from the light source within a single plane, and optical members for directing the deflected scanning laser beam on the surface of a photosensitive member through a beam emission aperture of the housing. A transparent member is provided at the beam emission aperture of the housing so as to satisfy the following equation:

$$X \geq \frac{\pi D0 \sqrt{1 - D0^2}}{4\lambda}$$

where
 X: distance (mm) from transparent member to surface of photosensitive member,
 $\lambda$: laser beam wavelength (mm),
 $D_0$: beam diameter (mm) at center intensity $1/e^2$ on surface of photosensitive member.

9 Claims, 10 Drawing Sheets photosensitive member surface photosensitive member surface photosensitive member surface photosensitive member surface photosensitive member surface photosensitive member surface

LASER BEAM OPTICAL SCANNING DEVICE

BACKGROUND OF THE INVENTION

1. Field of the Invention

The present invention relates to a laser beam optical scanning device, and more specifically relates to a laser beam optical scanning device which deflection scans a unidirectional laser beam emitted from a light source within a single plane by a deflection assembly, so as to write an image on the surface of a photosensitive member.

2. Description of the Related Art

In recent years, laser printers have been developed which use laser beam optical scanning devices providing a laser generating section, a laser beam deflection scanning section, and image forming optical elements integratedly incorporated within a housing to accomplish the scanning exposure of an image on the surface of a photosensitive member. The aforesaid optical device comprises a single unit and is independent of other parts of the laser printer, and has become widely used particularly in a compact laser printer because said optical device is easily adjustable during manufacture as well as easily maintained.

A common problem heretofore is soiling of the print head and the resultant defects of the reproduced image. Some cause of said print head soiling have been overlooked, including, from the perspective of the construction of the electrophotographic system, the residual toner remaining in the vicinity of the print head, and foreign matter which adheres to the print head during assembly or adjustment operations (e.g., mainly human hair of the technicians). Furthermore, human hair of an operator occasionally adheres to the print head or in the vicinity thereof during routine maintenance and paper jam processing.

That is, residual toner particles (several tens of microns in diameter) remains in the laser beam emitting section and are flow from the emission aperture into the print head in the air currents generated via the rotation of the polygonal mirror, thereby soiling the optical elements. A transparent glass plate may be mounted on the aforesaid emission aperture to prevent the previously described airborne flow of toner particles.

The previously described airborne flow of toner particles into the print head is prevented when a glass plate is provided on the emission aperture, however, such an arrangement has the disadvantage in allowing toner particles, hair and the like to adhere to the exterior side of said glass plate. In particular, the adherence of hair, which has a large shielding area compared to that of toner particles, directly affects image loss.

SUMMARY OF THE INVENTION

A main object of the present invention is to provide a laser beam optical scanning device capable of normally forming excellent images on the surface of a photosensitive member.

A further object of the present invention is to provide a laser beam optical scanning device which does not produce image defects due to image loss and the like even when fine foreign matter adheres to a transparent member disposed medially to the optical elements and the photosensitive member.

These objects of the present invention are accomplished by providing a laser beam optical scanning device comprising:

a light source for emitting a unidirectional laser beam;

deflection means for deflection scanning a laser beam emitted from said light source within a single plane;

optical means for forming an image with said scanning laser beam deflected by said deflection means on the surface of a photosensitive member; and a transparent member disposed medially to said optical means and said photosensitive member, said laser beam optical scanning device being characterized by the distance between said photosensitive member and said transparent member satisfying the following equation:

$$X \geq \frac{\pi D_0 \sqrt{1-D_0^2}}{4\lambda}$$

where

X: distance (mm) from transparent member to surface of photosensitive member,

λ: laser beam wavelength (mm), $D_0$: beam diameter (mm) at center intensity $1/e^2$ on surface of photosensitive member.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 5A shows the distribution on the surface plane, and FIG. 5B shows the distribution perpendicular thereto;

FIG. 6A shows the distribution on the surface plane, and FIG. 6B shows the distribution perpendicular thereto;

FIG. 7A shows the distribution on the surface plane, and FIG. 7B shows the distribution perpendicular thereto;

FIG. 8A shows the distribution on the surface plane, and FIG. 8B shows the distribution perpendicular thereto;

FIG. 9A shows the distribution on the surface plane, and FIG. 9B shows the distribution perpendicular thereto;

FIG. 10A shows the distribution on the surface plane, and FIG. 10B shows the distribution perpendicular thereto.

DETAILED DESCRIPTION OF THE PREFERRED EMBODIMENTS

The preferred embodiments of the laser beam optical scanning device of the present invention are described hereinafter with reference to the accompanying drawings. The embodiments below described the present invention in terms of a print head for a laser printer.

Figure 1:
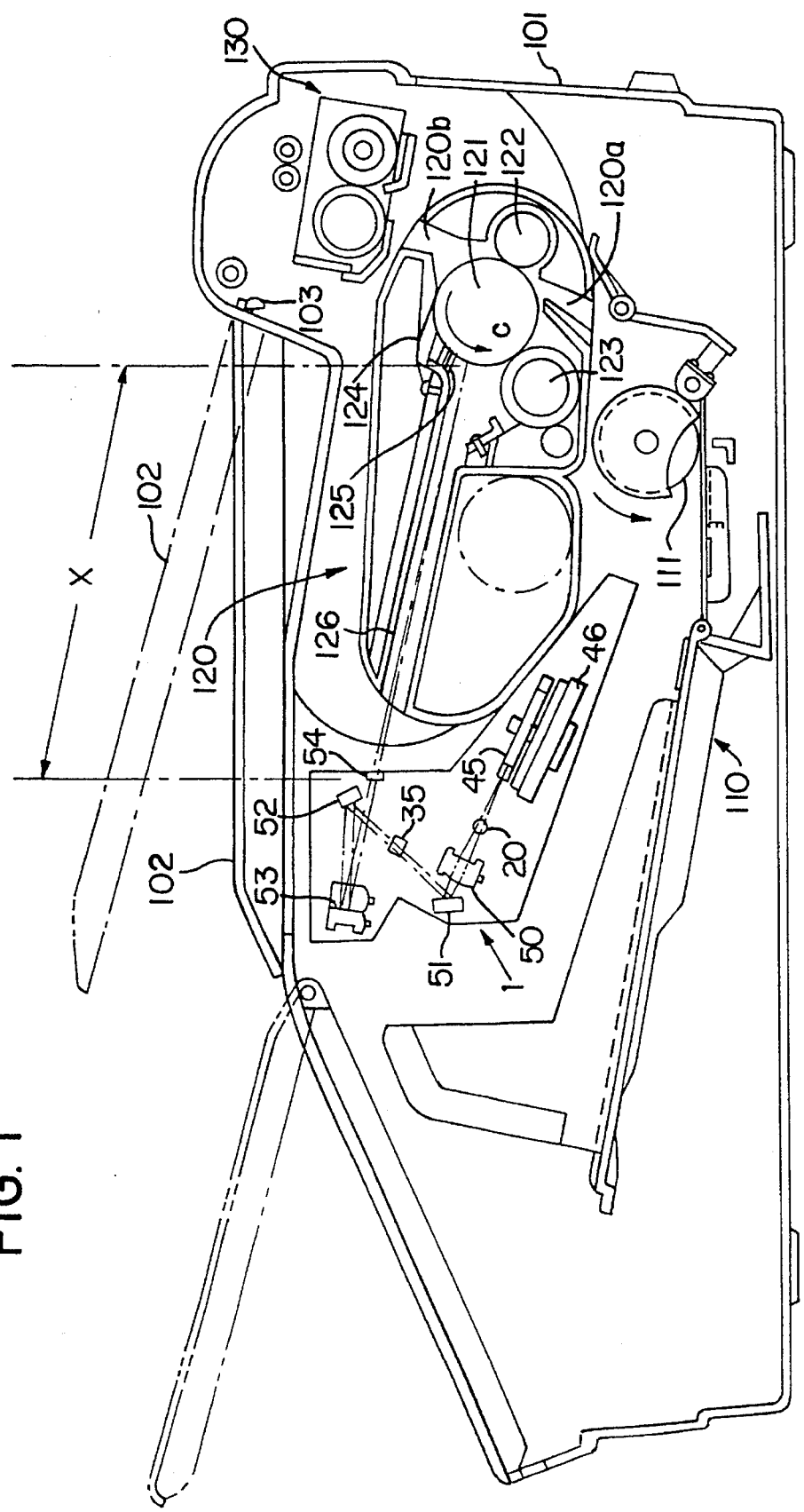
FIG. 1 is a section view briefly showing the construction of a laser printer.

In FIG. 1, the laser printer incorporates within a frame 101 of the main body a print head 1, sheet accommodating section 110, image forming cartridge 120, fixing device 130 and the like. At the top of the frame 101 of the main body is provided a cover 102 supported by a pin 103 so as to be openable in an upward direction. The cover 102 functions as a printed sheet discharge tray during printing operations, and when in the upwardly open state allows maintenance and adjustment access to the interior of the apparatus.

Paper sheets are stacked in the accommodating section 110, and fed therefrom one sheet at a time via the rotation of a take-up roller 111. The fed paper sheet is transported to the paper path of the image forming cartridge 120.

The image forming cartridge 120 comprises a photosensitive drum 121, transfer roller 122, developing device 123, residual toner cleaner 124, residual charge discharging brush 125 and the like integrated in a single unit. The image forming cartridge 120 is provided with a guide slit 126 for the laser beam emitted from the print head 1 described later. A laser beam emitted through the aforesaid guide slit 126 forms an electrostatic latent image on the surface of the photosensitive drum 121 which rotates in the arrow c direction. This electrostatic latent image is developed by the developing device 123, and the developed image is transferred onto a sheet via a discharge from the transfer roller 122. After the aforesaid image transfer, the sheet is transported from the paper path 120b to the fixing device 130, where the toner is subjected to heat fusion, and the sheet is subsequently discharged onto the cover 102.

The print head 1 is described hereinafter.

Figure 2:
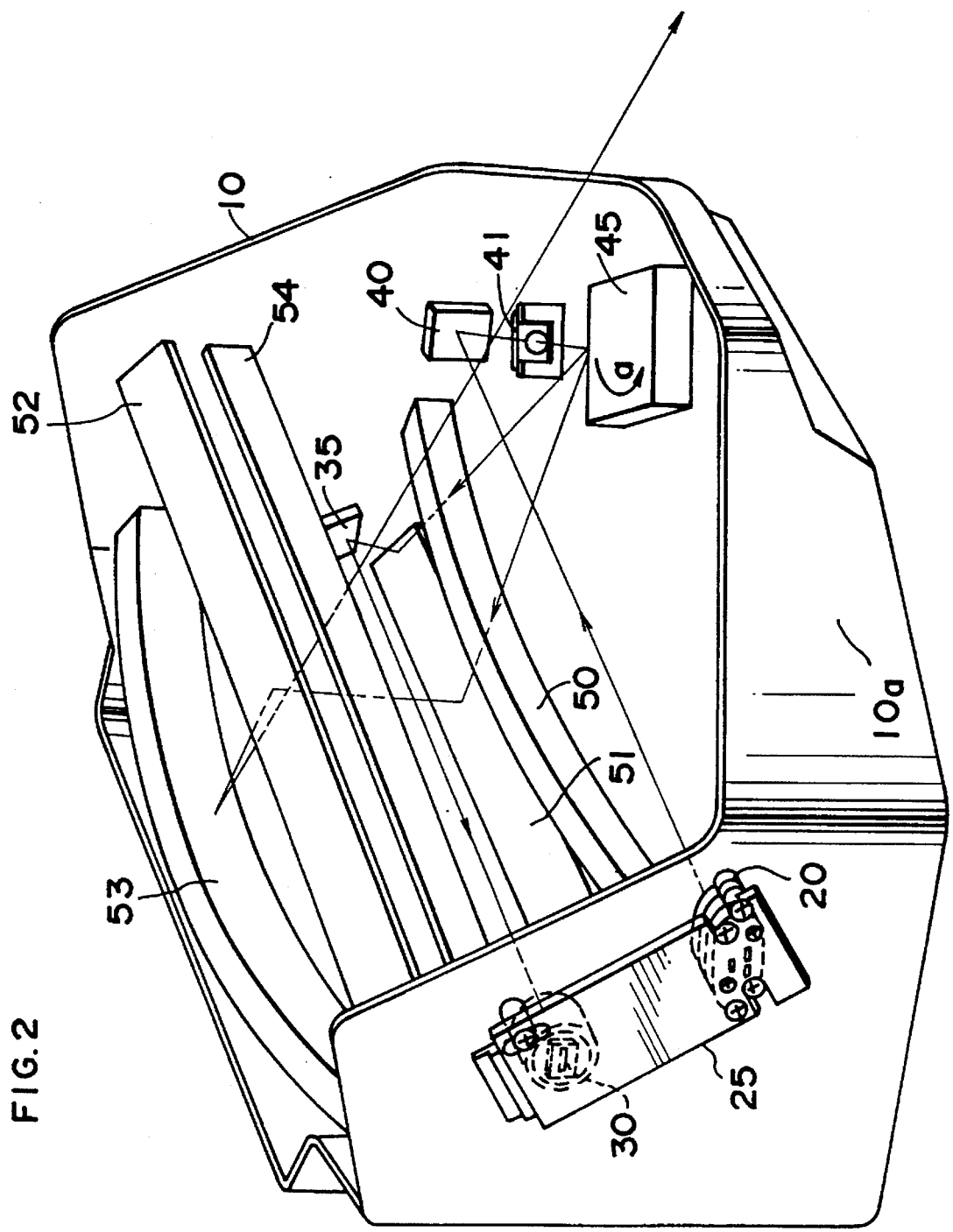
FIG. 2 is a perspective view briefly showing the construction of the print head.
Figure 3:
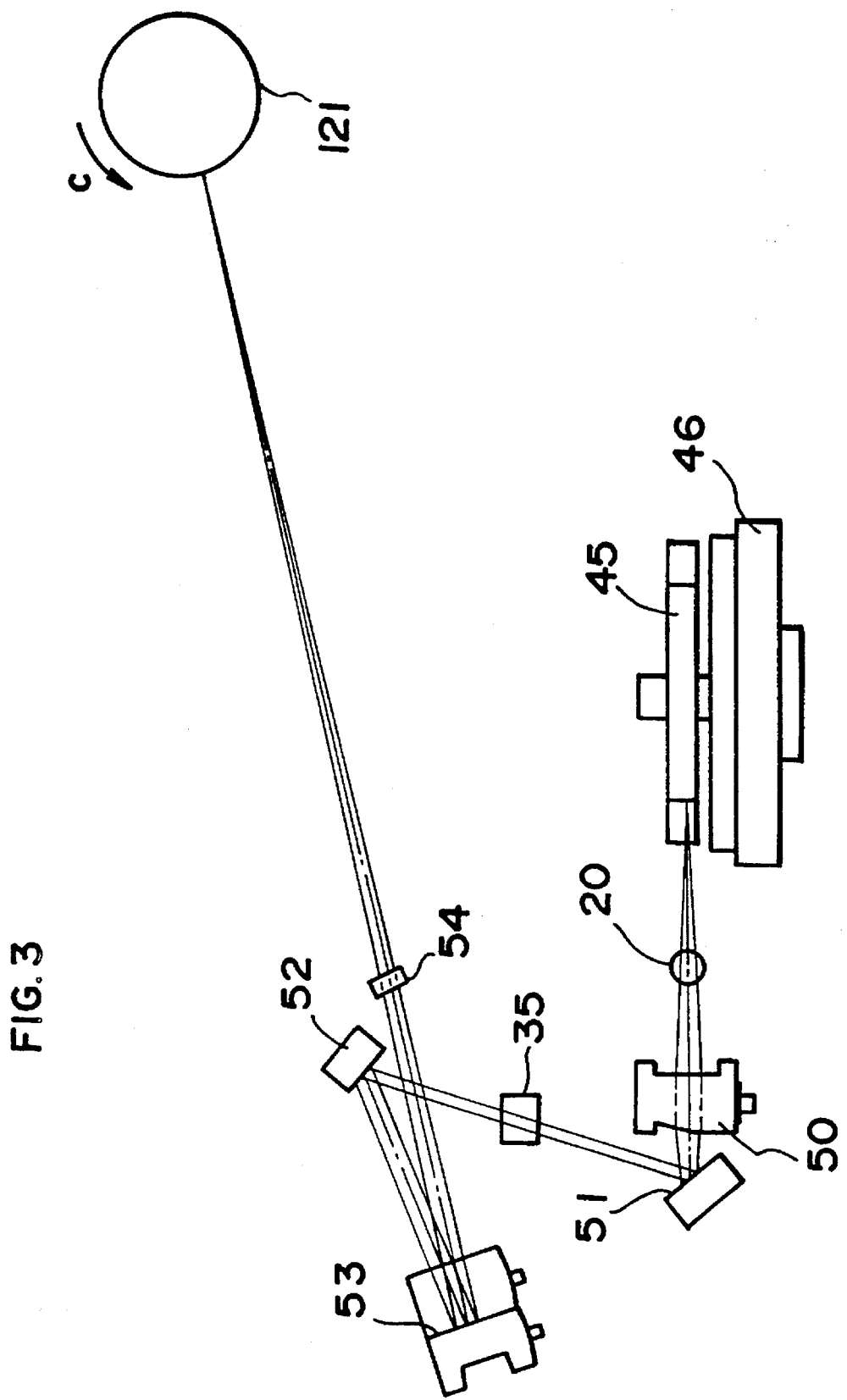
FIG. 3 is an elevation view showing the arrangement of each optical element and the laser beam path.
Figure 4:
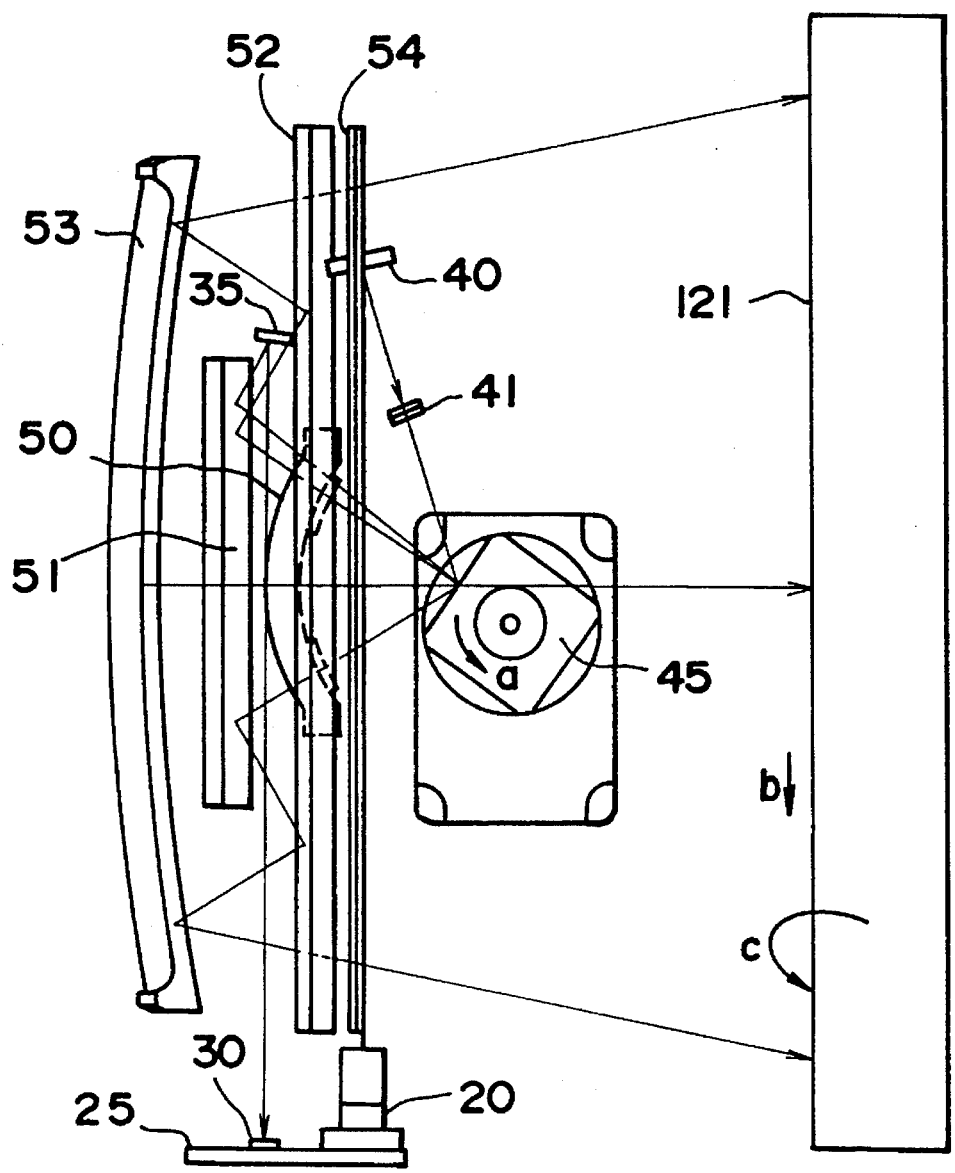
FIG. 4 is a top plan view showing the arrangement of each optical element and the laser beam path.

In FIGS. 2, 3 and 4, the print head comprises, briefly, a housing 10 integratedly formed of resin material, light source unit 20, print start position sensor 30 (hereinafter referred to as "SOS sensor"), polygonal mirror 45, toric lens 50, and toroidal mirror 53.

A laser beam emitted from the light source 20 is reflected by the plane mirror 40, is transmitted through the cylindrical lens 41, and impinges the polygonal mirror 45. The polygonal mirror 45 is provided with four reflective surfaces on its exterior surface, and is rotated at constant speed in the arrow a direction via a motor 46. Accordingly, a laser beam deflectively scans within a single plane at equiangular speed via each reflective surface of the rotating polygonal mirror 45. The scanned laser beam is transmitted through the toric lens 50, reflected by the plane mirrors 51 and 52, reflected by the toroidal mirror 53, transmitted through the glass plate 54, and forms an image on the surface of the photosensitive drum 121. When the photosensitive drum 121 is rotatably driven in the arrow c direction and the main scan of the laser beam is accomplished in the arrow b direction, and image is formed as an electrostatic latent image on the surface of the photosensitive drum 121 via the rotation (subscan) of the photosensitive drum 121 in the arrow c direction.

On the other hand, that portion of the laser beam at the leading edge portion thereof in the main scan direction which is deflected by the polygonal mirror 45 is reflected by the plane mirror 51, and subsequently reflected by the plane mirror 35 and impinges the SOS sensor 30. The print start position is determined for each scan line on the surface of the photosensitive drum 121 based on the laser beam detection signals of the SOS sensor 30.

The light source unit 20 provides a laser diode as the laser light source, photodiode for light quantity monitoring and collimator lens (not shown in the illustrations) for collimating the laser beam installed within a casing, and is fixedly mounted on a circuit board 25. The SOS sensor 30 is also fixedly mounted on the circuit board 25. A laser diode drive circuit (not illustrated) is installed on the circuit board 25, and the output portion of the SOS sensor 30 is electrically connected to the drive circuit on the circuit board 25.

The aforesaid glass plate 54 is disposed opposite the image forming cartridge 120, i.e., the toner particle source, so as to prevent said toner particles from flowing into the housing 10. There is some anxiety that image defects will result from toner particles adhering to the exterior side of the glass plate 54, human hair adhering to the interior surface of said glass plate 54 during assembly and adjustment of the print head, as well as human hair adhering to the exterior side of said glass plate 54 when the previously mentioned cover 102 is opened for routine maintenance.

The inventors of the present invention have simulated the light distribution on the photosensitive drum 121 when foreign matter having a diameter equivalent to a laser beam of diameter D is adhered to the glass plate 54 as a way to determine the laser beam energy loss. The toner particles are spherical and have a diameter of several tens of microns, whereas human hair is linear in shape and has a diameter of several tens of microns to a hundred microns.

FIGS. 5A and 5B through FIGS. 10A and 10B shows the results of the simulations. In each instance the drawings A show the light distribution on the plane of the surface of the photosensitive member. The laser beam diameter D is the diameter of the beam at a Gauss distribution beam of center intensity $1/e^2$ on the aforesaid glass plate 54. In each instance, the drawings B show the light distribution in a plane perpendicular to the surface of the photosensitive member.

Figure 5A:
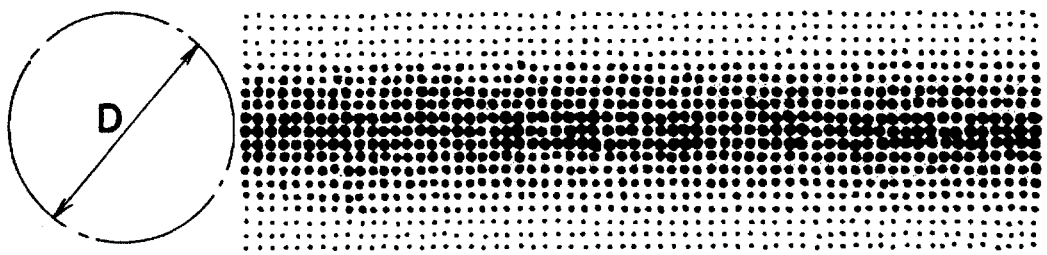
FIGS. 5A and 5B show the laser beam light distribution on the surface of the photosensitive member.
Figure 5B:
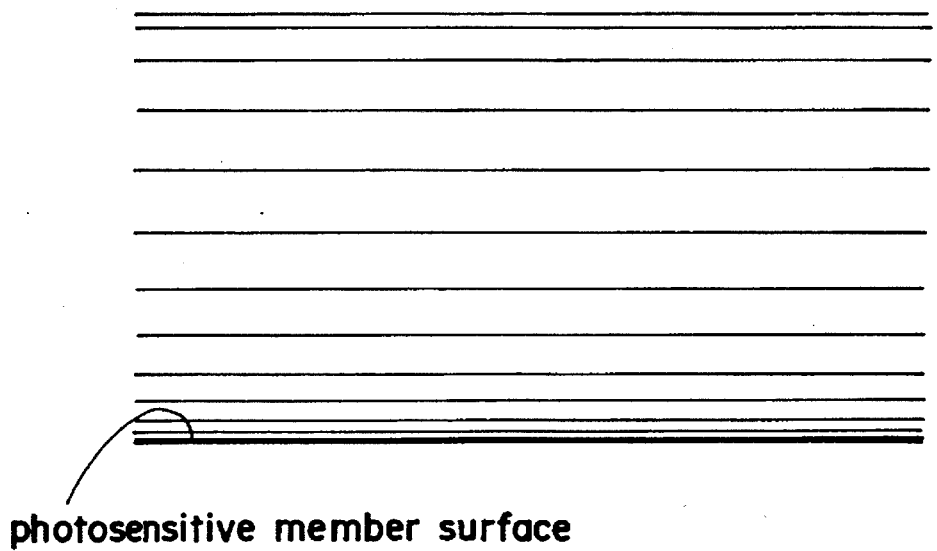
Figure 6A:
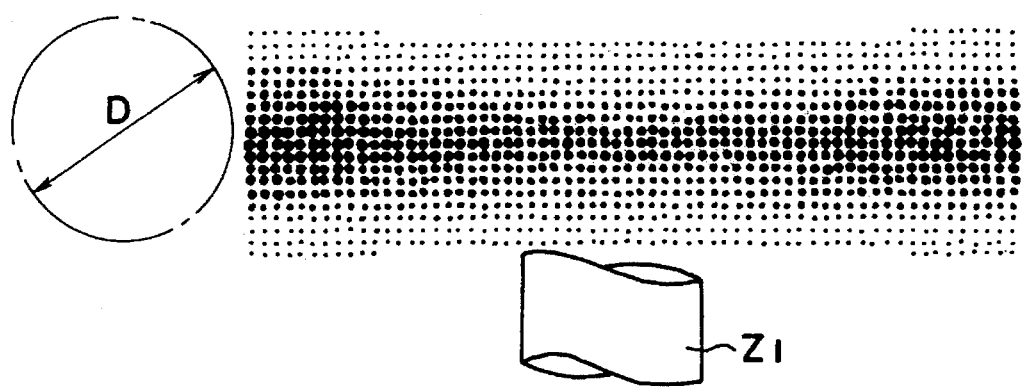
FIGS. 6A and 6B show the laser beam light distribution on the surface of the photosensitive member when foreign matter interposed between the beam and the surface has a thickness equal to the laser beam diameter.
Figure 6B:
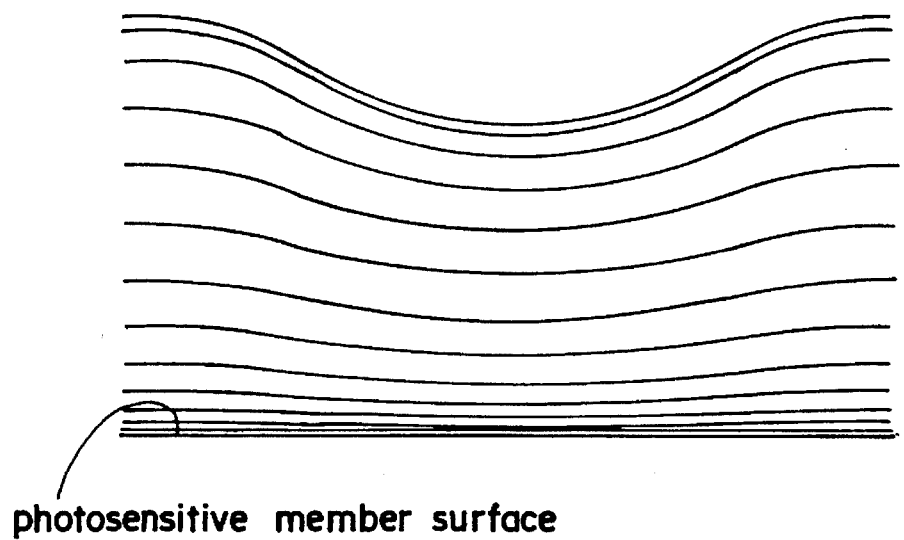
Figure 7A:
FIGS. 7A and 7B show the laser beam light distribution on the surface of the photosensitive member when foreign matter interposed between the beam and the surface has a thickness ½ the laser beam diameter.
Figure 7B:
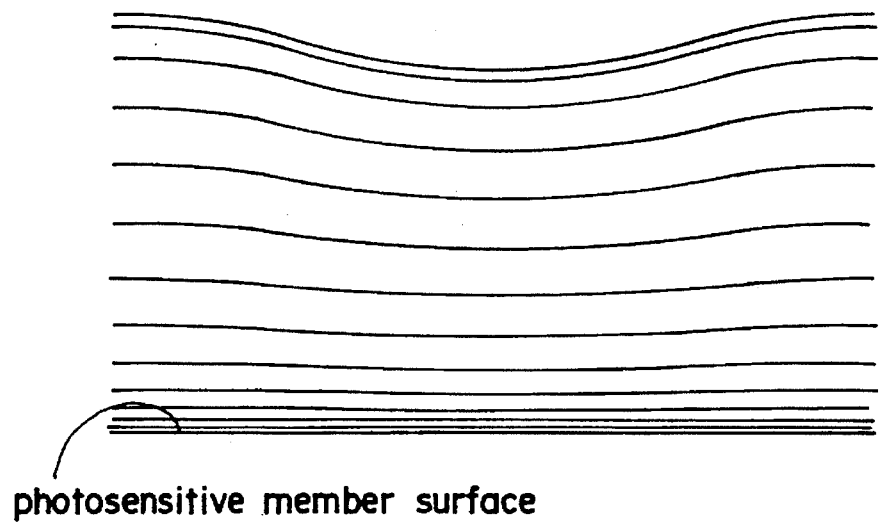
Figure 8:
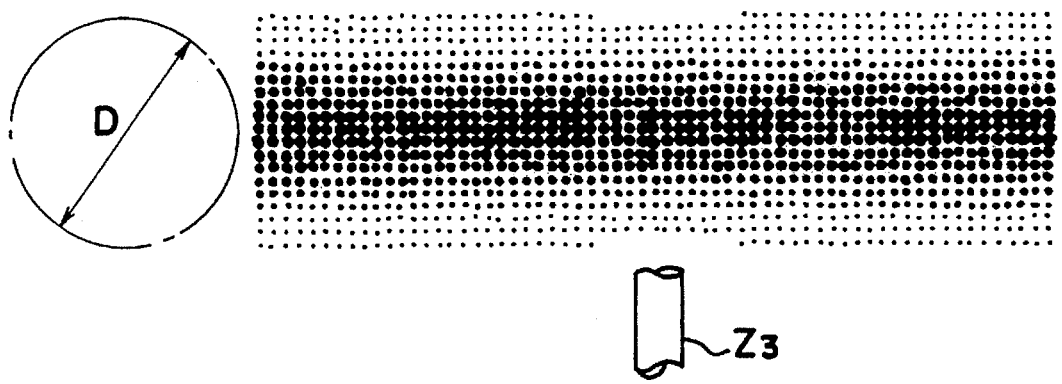
FIGS. 8A and 8B show the laser beam light distribution on the surface of the photosensitive member when foreign matter interposed between the beam and the surface has a thickness ⅓ the laser beam diameter.
Figure 8B:
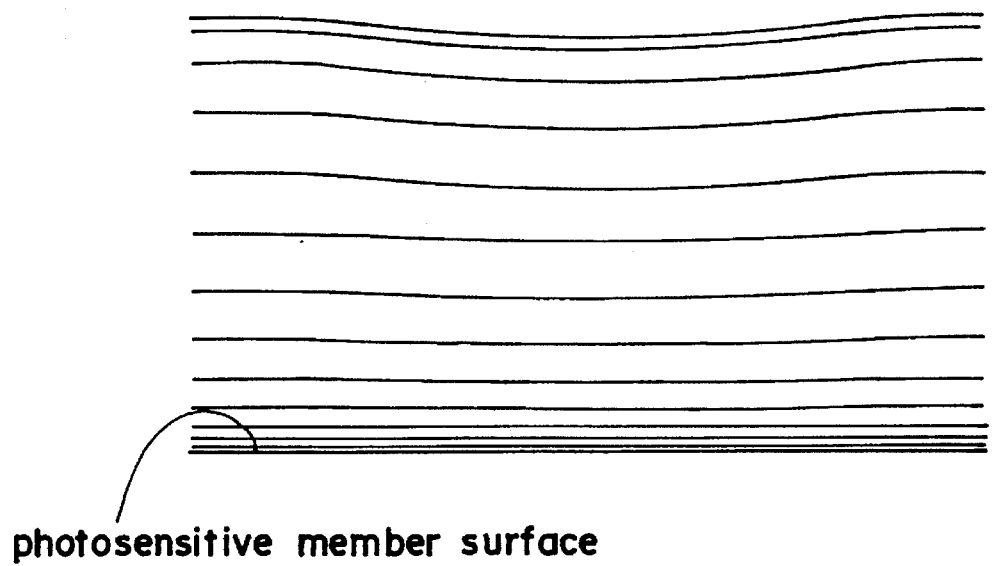
Figure 9A:
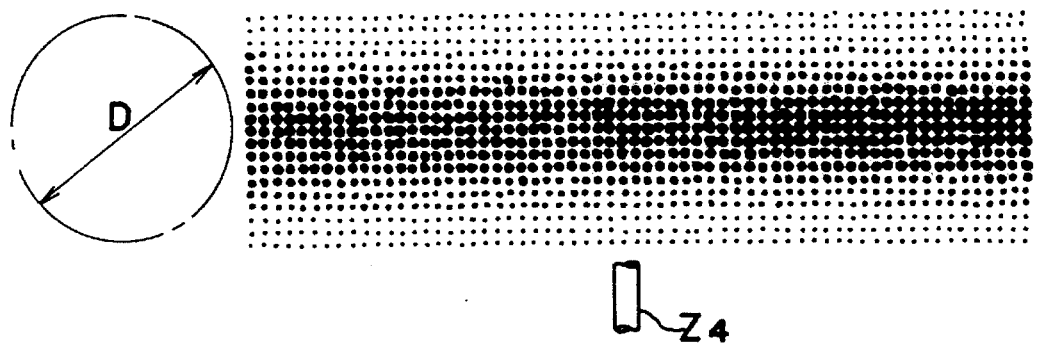
FIGS. 9A and 9B show the laser beam light distribution on the surface of the photosensitive member when foreign matter interposed between the beam and the surface has a thickness ⅒ the laser beam diameter.
Figure 9B:
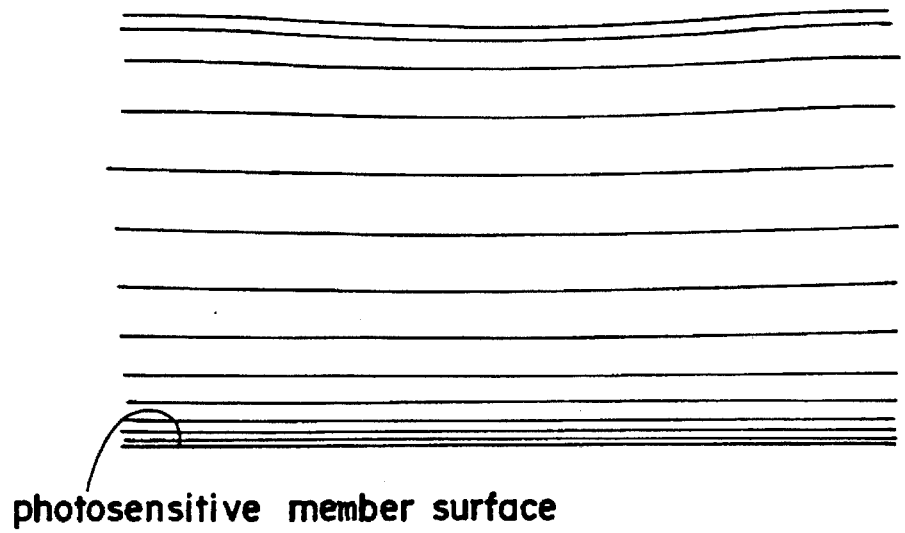
Figure 10:
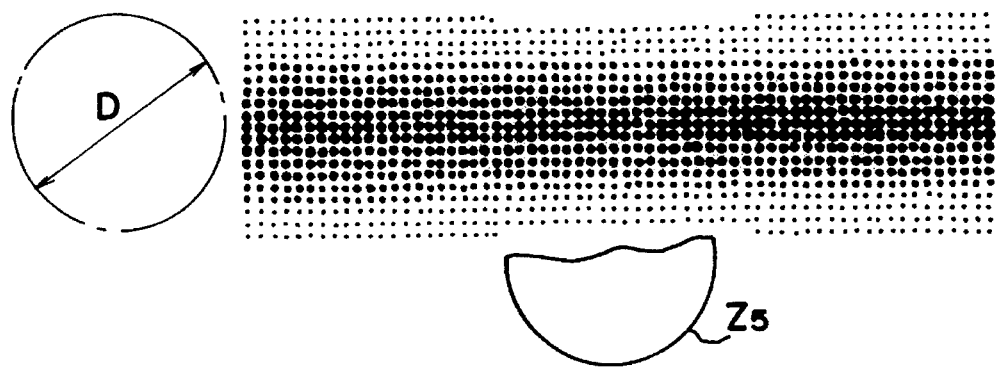
FIGS. 10A and 10B show the laser beam light distribution on the surface of the photosensitive member when foreign matter interposed between the beam and the surface has a diameter equal to the laser beam diameter.
Figure 10:
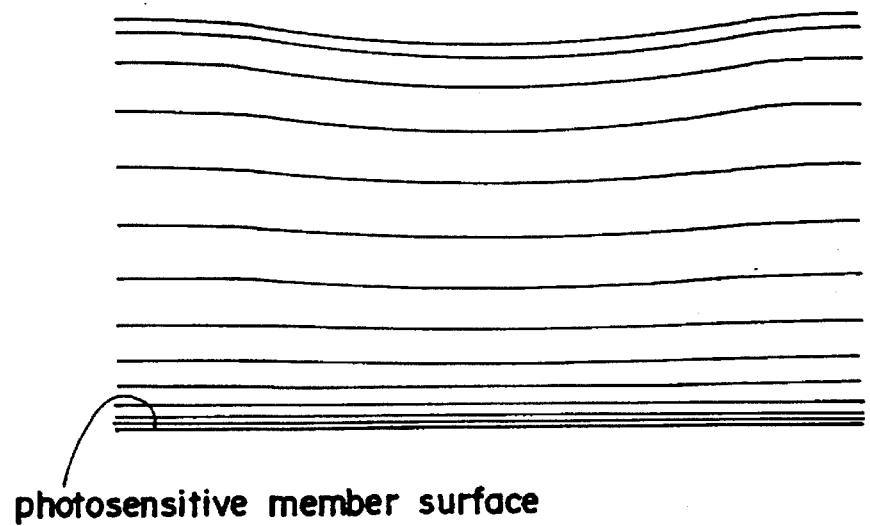

FIGS. 5A and 5B show the light distribution when no foreign matter adheres to the glass plate 54. The light distribution is naturally uniform. FIGS. 6A and 6B show the light distribution when foreign matter Z1 having a thickness equal to the beam diameter D is present in the subscanning direction. FIGS. 7A and 7B show the light distribution when foreign matter Z2 having a thickness ½ the beam diameter D is present in the subscanning direction. FIGS. 8A and 8B show the light distribution when foreign matter Z3 having a thickness ⅕ the beam diameter D is present in the subscanning direction. FIGS. 9A and 9B show the light distribution when foreign matter Z4 having a thickness ⅒ the beam diameter D is present in the subscanning direction.

In the present invention, the beam diameter D is problematic when foreign matter is present at the emitting position, however, the simulation was performed by changing the thickness of the foreign matter while the beam diameter D was fixed. The thickness of the foreign matter to the beam diameter is relative, and the simulation of the change in the amount of light on the photosensitive member similarly utilized either (diameter or thickness) as the variable.

As can be clearly observed in FIGS. 6A and 6B through FIGS. 9A and 9B, the reduction in the amount of light on the surface of the photosensitive member decreases as the beam diameter D increases relative to the thickness of the foreign matter. If the beam diameter D is set so as to be 10-fold greater relative to the thickness of the foreign matter, there is virtually no influence as indicated in FIG. 9A.

FIGS. 10A and 10B show the light distribution when circular foreign matter Z5 (imaginary toner particle) having the same diameter as the beam diameter D is present on the glass plate 54. The influence produced by foreign matter such as toner particles is slight compared to the effect caused by human hair.

A mathematical analysis of the energy loss produced by foreign matter on the glass plate 54 is discussed hereinafter.

When a Gaussian distribution is made of beam intensity on the surface of the photosensitive member, and the center of the beam is designated (0, 0), the x axis direction dispersion is designated $\sigma x^2$ and the y axis direction dispersion is designated $\sigma y^2$, the total energy E on the surface of the glass plate is expressed by Equation (1) below.

$$E = \int_{-\infty}^{\infty} \int_{-\infty}^{\infty} e^{-[(\frac{x}{\sigma x})^2 + (\frac{y}{\sigma y})^2]} dxdy \tag{1}$$

When the beam passes through the glass plate and impinges the surface of the photosensitive member, the dispersion in the x axis direction becomes $\sigma x'^2$, and the dispersion in the y axis direction becomes $\sigma y'^2$. The energy distribution of the beam at this time is expressed by Equation 2.

$$ae^{-[(\frac{x}{\sigma x'})^2 + (\frac{y}{\sigma y'})^2]} dxdy \tag{2}$$

In the aforesaid equation, the value a is a correction constant derived from experimental data. When it is assumed that the total energy of the laser beam on the surface of the glass plate, and the total energy on the surface of the photosensitive member are conserved, the relationship therebetween is expressed by Equation 3 below.

$$a\sigma x' \sigma y' \pi = \sigma x \sigma y \pi \tag{3}$$

$$a = \frac{\sigma x \sigma y}{\sigma x' \sigma y'}$$

Then, we assume a situation wherein foreign matter having a radius (rx, ry) is adhered to the position $(x_0, Y_0)$ on the surface of the glass plate. When the laser beam center is at position $(x_1, 0)$, the energy S that is shielded by the foreign matter is expressed by the following Equation 4.

$$S = \int_{-ry}^{ry} \int_{-rx}^{rx} e^{-[(\frac{x+x_0-x_1}{\sigma x})^2 + (\frac{y+y_0}{\sigma y})^2]} dxdy \tag{4}$$

When the laser beam diameter on the surface of the photosensitive member is assumed to be constant regardless of the presence of foreign matter, the relationship between the energy on the surface of the glass plate and the energy on the surface of the photosensitive member is expressed by Equation 5.

$$\alpha a \int_{-\infty}^{\infty} \int_{-\infty}^{\infty} e^{-[(\frac{x}{\sigma x})^2 + (\frac{y}{\sigma y})^2]} dxdy = \sigma x \sigma y \pi - S \tag{5}$$

In the aforesaid equation, the value $\alpha$ is a loss constant expressing the energy loss due to foreign matter. When solving the left side of the Equation 5, the result is $\alpha \sigma x \sigma y \pi$, such that Equation 5 can be expressed as Equation 6.

$$\alpha \sigma x \sigma y \pi = \sigma x \sigma y \pi - S \tag{6}$$

When Equation 6 is solved for $\alpha$, the following Equation 7 is derived.

$$\alpha = 1 - \frac{S}{\sigma x \sigma y \pi} \tag{7}$$

The constants a and $\alpha$ become clear. Therefore, when the laser beam energy E' on the surface of the photosensitive member expressed by Equation 8 is solved via simulation, the influence exerted by the foreign matter on the energy on the surface of the photosensitive member can be evaluated.

$$E' = \alpha a \int_{-\infty}^{\infty} e^{-[(\frac{x-x_1}{\sigma x})^2 + (\frac{y}{\sigma y})^2]} dx_1 \tag{8}$$

In relation to the laser beam diameter $D_0$ on the surface of the photosensitive member 121, Equation 9 expresses the laser beam diameter D on the glass plate 54 which is separated from the surface of the photosensitive member 121 by x millimeters.

$$D = D_0 \sqrt{1 + \left(\frac{4\lambda x}{\pi D_0^2}\right)^2} \tag{9}$$

Where $\lambda$ is the laser beam wavelength.

When the value x in Equation 9 is changed, the following Equation 10 is derived.

$$X = \frac{\pi D_0 \sqrt{D^2 - D_0^2}}{4\lambda} \tag{10}$$

The laser beam diameter D on the surface of the glass plate 54 is desirably 10-fold greater than the thickness of the foreign matter for the aforesaid simulation, i.e., the diameter D is desirably 1 mm or greater. The distance x is expressed by the final Equation 11.

$$X \geq \frac{\pi D_0 \sqrt{1 - D_0^2}}{4\lambda} \tag{11}$$

By setting the distance of the glass plate 54 from the surface of the photosensitive drum 121 at x millimeters which satisfies Equation 11, the disadvantages of image loss and dislocation can be prevented by maintaining uniform light distribution on the surface of the photosensitive drum 121 even when human hair adheres to the aforesaid glass plate 54. In the present embodiment, when the diameter $D_0$ is 85 μm, and wavelength $\lambda$ is set at $780 \times 10^{-6}$ mm, the distance x is set at 85.3 mm or greater.

The glass plate 54 is preferably positioned in a perpendicular direction, as in the previously described embodiment, because foreign matter readily falls from the surface of the glass plate 54. The transparent glass plate 54 is positioned substantially parallel relative to a gravitational force to permit foreign matter to fall off its surface. When the cover 102 is opened exposing the glass plate 54, the hair of an operator readily adheres to the surface of the glass plate 54. The present invention is particularly effective relative to the glass plate 54 in the aforesaid position.

Conventionally, when a plurality of laser beam image forming lenses are used, the last stage lens is mounted to the emitting aperture of the housing, as a well known means for preventing debris from flowing into the housing. However, the lenses to which the debris adheres must be replaced, thereby increasing costs. On the other hand, the present embodiment of the invention provides an inexpensive and disposably replaceable glass plate 54. The present invention thus prevents image defects due to adhering debris by providing the aforesaid inexpensive glass plate.

Typically, the print head housing 10 is dividing into two section. As shown in FIG. 2, the open portion of the base 10a and base 10b is protected by a cover member (not shown in the drawing). The base 10a is designed to have high rigidity, and the polygonal mirror 45 and optical elements 50, 51, 52, and 53 are mounted on the base 10a, because precise positioning is required. An emission aperture is formed in the cover member, and the glass plate 54 is mounted to this aperture. When the optical elements are mounted to the cover member, the precision of the positioning is reduced, causing defects in the optical characteristics. However, if the glass plate 54 is mounted on the cover member as in the present embodiment, the optical characteristics are unaffected even if there is some loss of positioning precision, and debris is prevented from entering the unit via the aperture. Accordingly, the present invention prevents image defects caused by adhering debris by providing the glass plate 54 provided to prevent such defects.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam optical scanning device comprising:

a light source for emitting a unidirectional laser beam;

deflection means for deflection scanning a laser beam emitted from said light source within a single plane;

optical means for forming an image with said scanning laser beam deflected by said deflection means on the surface of a photosensitive member; and a transparent member disposed medially to said optical means and said photosensitive member, the distance between said photosensitive member and said transparent member satisfying the following equation:

$$X \geq \frac{\pi D0 \sqrt{1 - D0^2}}{4\lambda}$$

where

X:distance (mm) from transparent member to surface of photosensitive member,

λ:laser beam wavelength (mm), $D_0$:beam diameter (mm) at center intensity $1/e^2$ on surface of photosensitive member.

2. A laser beam optical scanning device as claimed in claim 1 wherein said light source, deflection means and optical means are integratedly incorporated within a housing, and said transparent member is provided at a side of said housing for preventing fine foreign matter from flowing into the housing.

3. A laser beam optical scanning device as claimed in claim 2 wherein said transparent member is provided at the housing so as to confront an image forming unit which integrally accommodates the photosensitive member, a developing device, a transfer device and a cleaner therein, so that toner particles scattered from said image forming unit is prevented from flow into the housing.

4. A laser beam optical scanning device as claimed in claim 1 wherein said transparent member is substantially parallelly disposed relative to a gravitational force.

5. The laser beam optical scanning device of claim 1 wherein the laser beam diameter at the location of the transparent member is approximately 1 mm or greater.

6. In an image forming apparatus having a photosensitive member, a developing device, a transfer device and a cleaner, the improvement of a laser beam optical scanning device comprising:

a light source for emitting a unidirectional laser beam;

deflection means for deflection scanning of a laser beam emitted from said light source;

optical means for forming an image with said scanning laser beam deflected by said deflection means on the surface of a photosensitive member with a laser beam of approximately a circular cross-section; and a transparent member disposed medially to said optical means and said photosensitive member, the distance between said photosensitive member and said transparent member satisfying the following equations:

$$D \cong 1 \text{ mm and}$$

$$X \geq \frac{\pi D0 \sqrt{1 - D0^2}}{4\lambda}$$

where

X:Distance (mm) from transparent member to surface of photosensitive member,

λ:laser beam wavelength (mm),

D:laser beam diameter at transparent member;

$D_0$:laser beam diameter (mm) at center intensity $1/e^2$ on surface of photosensitive member.

7. A laser beam optical scanning device as claimed in claim 6 wherein said light source, deflection means and optical means are integratedly incorporated within a sealed housing, and said transparent member is provided at a side of said sealed housing for preventing fine foreign matter from flowing into the housing.

8. A laser beam optical scanning device as claimed in claim 7 wherein said transparent member is provided at the housing so as to confront an image forming unit which integrally accommodates the photosensitive member, developing device, transfer device, and the cleaner therein, so that toner particles scattered from said image forming unit is prevented from flow into the housing.

9. A laser beam optical scanning device as claimed in claim 6 wherein said transparent member is substantially parallel to a gravitational force.

* * * * *